United States Patent
Filsinger et al.

(10) Patent No.: US 6,843,953 B2
(45) Date of Patent: Jan. 18, 2005

(54) METHOD AND DEVICE FOR PRODUCING FIBER-REINFORCED COMPONENTS USING AN INJECTION METHOD

(75) Inventors: Jürgen Filsinger, Aying (DE); Torsten Lorenz, Augsburg (DE); Franz Stadler, Bühmfeld (DE); Stefan Utecht, Kaufering (DE)

(73) Assignee: EADS Deutschland GmbH, München (DE)

( * ) Notice: Subject to any disclaimer, the term of this patent is extended or adjusted under 35 U.S.C. 154(b) by 227 days.

(21) Appl. No.: 09/980,976

(22) PCT Filed: Mar. 13, 2001

(86) PCT No.: PCT/EP01/02777

§ 371 (c)(1),
(2), (4) Date: Mar. 5, 2002

(87) PCT Pub. No.: WO01/68353

PCT Pub. Date: Sep. 20, 2001

(65) Prior Publication Data

US 2003/0011094 A1 Jan. 16, 2003

(30) Foreign Application Priority Data

Mar. 17, 2000 (DE) .......................................... 100 13 409

(51) Int. Cl.⁷ ............................................. B29C 70/44
(52) U.S. Cl. ................... 264/510; 264/102; 264/257; 264/258; 264/324; 264/511; 264/571; 425/389; 425/390; 156/245; 156/285; 156/286
(58) Field of Search ................................ 264/510, 511, 264/571, 102, 324, 257, 258; 425/389, 390; 156/285, 286, 245

(56) References Cited

U.S. PATENT DOCUMENTS

| | | | | |
|---|---|---|---|---|
| 4,132,755 A | * | 1/1979 | Johnson ...................... 264/553 |
| 4,942,013 A | | 7/1990 | Palmer et al. |
| 5,576,030 A | * | 11/1996 | Hooper ....................... 425/112 |
| 6,391,436 B1 | * | 5/2002 | Xu et al. ................. 428/298.1 |
| 6,406,659 B1 | * | 6/2002 | Lang et al. ................. 264/510 |
| 2002/0022422 A1 | * | 2/2002 | Waldrop, III et al. ....... 442/179 |

FOREIGN PATENT DOCUMENTS

DE    198 13 105    9/1999

* cited by examiner

Primary Examiner—Stefan Staicovici
(74) Attorney, Agent, or Firm—Kenyon & Kenyon

(57) ABSTRACT

In a method for producing fiber-reinforced plastic components made of dry fiber composite preforms by an injection method for injecting matrix material, the arrangement of the fiber composite preform on one surface of the preform resulting in a flow promoting device, on a tool, creates a first space by a gas-permeable and matrix-material-impermeable membrane surrounding the preforms. Formation of a second space arranged between the first space and the surroundings by a foil, which is impermeable to gaseous material and matrix material, is provided, with removal by suction, of air from the second space resulting in matrix material being sucked from a reservoir into the evacuated first space and with the flow promoting device causing distribution of the matrix material above the surface of the preform facing the flow promoting device, thus causing the matrix material to penetrate the preform vertically.

5 Claims, 6 Drawing Sheets

METHOD AND DEVICE FOR PRODUCING FIBER-REINFORCED COMPONENTS USING AN INJECTION METHOD

FIELD OF THE INVENTION

The present invention relates to a method for producing fiber-reinforced plastic components made of dry fiber composite preforms by an injection method and subsequent low-pressure curing and to a device for implementing this method.

BACKGROUND INFORMATION

Such methods use dry fiber composite preforms in order to produce components with geometric shapes that may be unwindable, non-unwindable or not completely unwindable. The dry fiber composite preform can be a woven fabric, a multi-axis interlaid scrim or a warp-thread reinforced unidirectional preform. The above-mentioned preforms are used in the production of components made of fiber-reinforced material. They represent an intermediate process step before infiltration by resin and curing occur.

Such a method is referred to as a so-called resin film infusion (RFI) method wherein dry carbon fibers, carbon fiber woven fabrics or carbon fiber interlaid scrim are placed in a curing device before a specified non-liquid quantity of resin film is applied to them from the outside. The curing tools equipped and evacuated in this way are subsequently cured in an autoclave or another pressure receptacle by exposure to temperature and pressure. The use of pressure receptacles and the associated complex tools that are necessary are however very expensive, rendering such methods complex also in regard to temperatures and pressures to be maintained. The scope of application of such methods is thus limited.

Furthermore, the use of dry preform components is described, for example, in German Published Patent Application No. 198 13 105, which describes a method for producing fiber composite components wherein the fibers and the matrix material are formed in a tool, forming a mold cavity, the tool including at least two parts, with the air situated in the mold cavity being able to escape. In this arrangement, a porous membrane is placed into the mold cavity, in front of the apertures, with the pores of said porous membranes being of such a size that air can be evacuated without hindrance while the matrix material is retained in the mold cavity.

The foregoing solution does not involve any application of pressure. However, it is associated with a disadvantage in that the size of components that can be produced with this method is limited, because the matrix material can be introduced into the fibers, i.e., into the preforms, only in a limited way, provided a central matrix feed bush has been provided, because the matrix has to flow along the preform plane, i.e., along the fibers. Due to the distance to be covered and the resistance put up by the material, this direction of flow creates the largest flow resistance to the matrix. Thus, impregnation along the length of material flow is limited. As an alternative, the matrix is put in place over an area. To this effect, resin reservoirs, situated on the component surface, are used, which require their own expensive resin supply device up to the preform, thus at every position posing the risk of a leakage (risk of rejects).

There is a further disadvantage in that this method can meet very exacting quality standards of the component to be produced only to a limited extent. This is because as a result of the potential resin passages through the vacuum foil and the membrane up to the preform surface, matrix material can penetrate through the membrane in many locations of the component, thus sealing off said membrane from above. In this case, air evacuation no longer functions and pores form within the laminate, because of the reaction during the curing process (e.g. as a result of trapped air, chemical separation, volatile components etc.). Such pores, which can negatively affect the quality of the component, cannot be eliminated.

Other conventional low-pressure methods, such as, for example, VARI (DLR) do without a membrane and two-part vacuum chambers. They avoid pore formation by process management of the vacuum and temperature outside the boiling range of the matrix material. In this way, no pores arise in the component. However, there is a disadvantage in that temperature and vacuum management must be very exactly adhered to at every position of the component, to avoid locally entering the boiling range of the matrix, with subsequent local pore formation. In the case of large components, such precise process management can only be realized with considerable difficulty and expense. This method has a further disadvantage in that as a result of permanent suction to maintain a vacuum, matrix material can be drawn from the component, which again can create pores. Furthermore, a resin trap or similar is necessary so as to prevent damage to the vacuum pump as a result of any matrix material issuing.

It is therefore an object of the present invention to provide a method for producing fiber-reinforced plastic components made of dry fiber composite preform by an injection method and a device for implementing the method, the method being suitable even for larger components, and allowing process management which is as simple as possible while at the same time making it possible to achieve good component quality.

SUMMARY

The above and other beneficial objects of the present invention are achieved by providing a method and a device as described herein.

With the solution according to the present invention, it is possible to achieve top quality components. This is in particular advantageous in the case of highly stressed structural carbon fiber reinforced plastic components in the aircraft industry. Typical parameters indicating the quality of the components include, e.g., the number of pores within the cured carbon fiber reinforced plastic laminate and the temperature resistance expressed in the glass-transition temperature of the matrix material after the process.

The solution according to the present invention applies to the production of composite reinforced plastic components containing carbon fibers, glass fibers, aramide fibers, boron fibers or hybrid materials, the geometric shapes of which may be unwindable, non-unwindable or not completely unwindable. The solution is also suitable for the production of non-stiffened or stiffened, large-area planking fields, plastics tools or tapered overlap repairs of damaged fiber composite components. Stiffening may be achieved by so-called integral stiffening (profiles made of carbon fiber reinforced plastic, etc., profiles comprising a combination of sandwich and carbon fiber reinforced plastic, etc.) or stiffening may be achieved by a typical sheet-like sandwich structure.

The solution according to the present invention provides a cost-effective method for producing fiber reinforced components, plastics tools and repair patches for tapered overlap repairs using vacuum injection technology and curing in a vacuum, without the use of an autoclave or without the use of overpressure.

The present invention is described below with reference to the several Figures.

DETAILED DESCRIPTION

Figure 1:
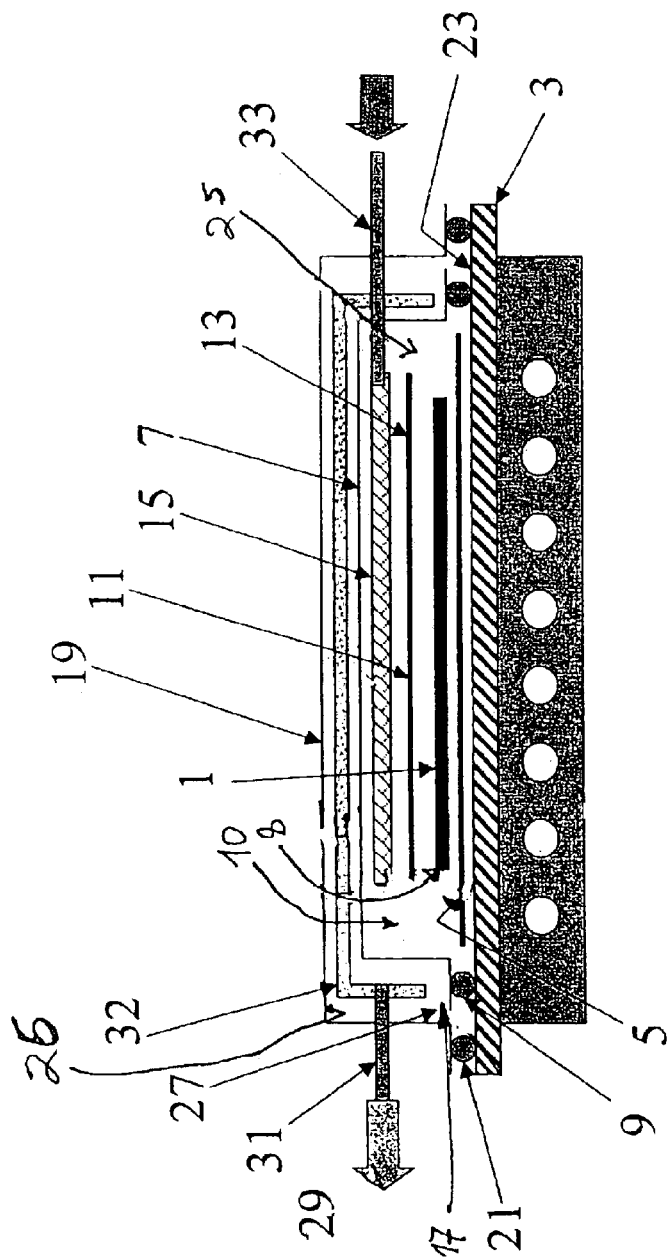
FIG. 1 is a schematic cross-sectional view through a device according to the present invention, the device being suitable to implement the method according to the present invention.

In the device illustrated in FIG. 1, the component or dry fiber composite preform 1 to be produced is arranged on a tool 3, for example, by a mounting 5. The component or laminate may be a reinforced plastic component including carbon fibers, glass fibers, aramide fibers, boron fibers or hybrid materials, the geometric shape of which may be unwindable, non-unwindable or not completely unwindable. The component or laminate is in particular suitable for the production of non-stiffened or stiffened, large-area planking fields, plastics tools or tapered overlap repairs of damaged fiber composite components. Stiffening may be achieved by so-called integral stiffening (profiles made of carbon fiber reinforced plastics, etc., profiles including a combination of sandwich and carbon fiber reinforced plastics, etc.) or stiffening may be achieved by a typical sheet-like sandwich structure. The shape of tool 2 is suitable for accommodating the component 1 or, if necessary, the mounting 5. The tool 2 may be made from various suitable materials, e.g., wood, steel, sheet metal, glass, etc.

Figure 6:
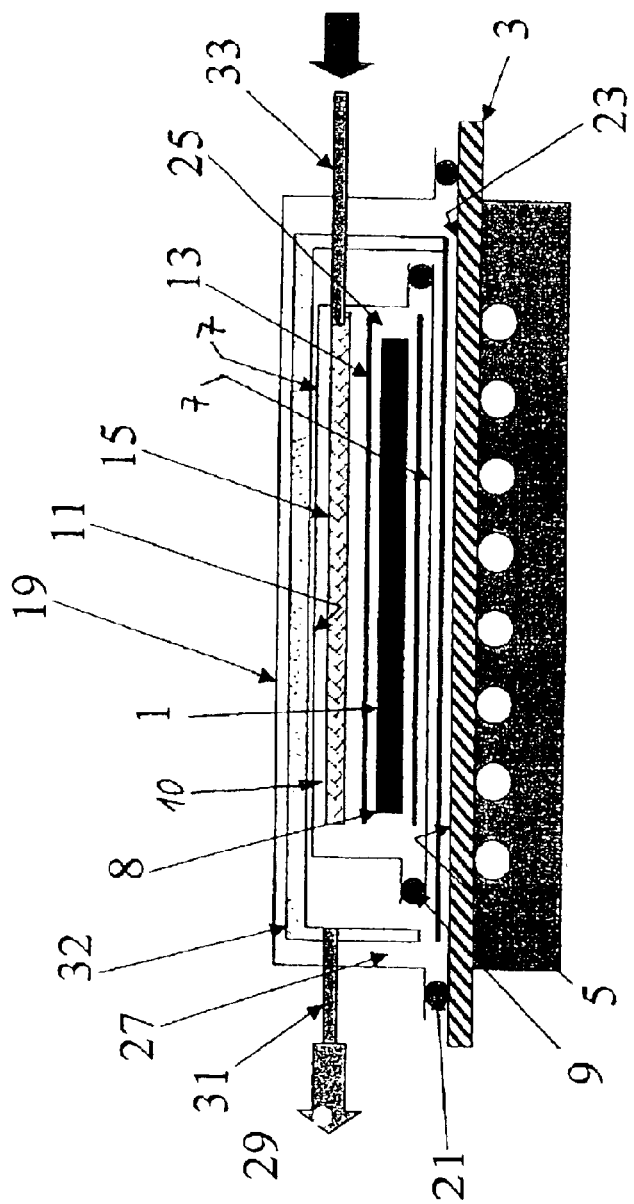
FIG. 6 is a schematic cross-sectional view of yet another example embodiment of the device according to the present invention.

Component 1 is covered by a semi-permeable membrane 7, which is gas-permeable but which prevents penetration of matrix material. Outside the circumferential area 8, the membrane 7 is sealed as closely as possible to the component 1 by a seal 9, which seals the first space 10 formed by the membrane 7 and the mounting 5 or the tool surface 3. As an alternative, the membrane 7 may also surround the entire component as illustrated in FIG. 6. This may be achieved by the seal 9 (FIG. 6) or without such a seal, by designing the membrane 7 in a single piece. Between the component 1 and the membrane 7, above the entire surface 11 of the component 1 facing the membrane 7, a peel ply 13 (optional) and a spacer as a flow promoting device 15 may be arranged. The peel ply 13 and the spacer serve to hold the membrane 7 at a distance from the surface 11 of the component 1. The flow promoting device 15 may be a type of grate or screen or a stiff woven or knitted or braided fabric that does not significantly compress when a vacuum is applied. The fabric includes, for example, metal, plastics or semi-finished textile materials.

The arrangement 17 including mounting 5, component 1, membrane 7 with seal 9 as well as peel ply 13 and flow promoting device 15, is covered by a foil 19, which is impermeable to gas. Around the circumference of the membrane 7, the foil 19 is sealed on the tool 3 by a seal 21 so that the second space or interior space 27, which is formed by the surface 23 of the tool 3 and the internal wall 26 of the foil 19, is sealed off from the surroundings. A ventilation fabric 32, for example, a woven glass fabric, a fibrous web, etc., is placed between the foil 19 and the membrane 7. This ventilation fabric 32 leads the air and gasses, which were removed by suction through the membrane, from the interior space 27, along the membrane surface, for removal by suction through the vacuum pump 29. This interior space 27 may be evacuated by a vacuum pump 29 and a respective gas pipe 31 which leads into the interior space 27. In addition, a second pipe 33 leads into the interior space 27, through which pipe 33 matrix material and in particular resin, may be introduced into the interior space 27.

To feed matrix material into the component 1, hoses or pipes 33, which are connected to a resin reservoir, lead into a space 25 arranged in the first space 10. The tool and the reservoir for the matrix material are located on hot plates, within a heated chamber, within a heatable liquid (oil bath, etc.) or within a controllable oven, if the selected resin system requires thermal treatment during injection.

The foil 19, the peel ply 13, the membrane 7, the ventilation fabric 32 and the flow promoting device 15 all must be resistant, for the duration of the process, to the matrix systems used. In addition they must also be resistant to the temperatures that occur during the process. Depending on the particular geometric shape to be produced, placement onto such a shape by stretching, fold formation, etc. must be possible.

The foil 19 is a gas-impermeable state-of-the-art vacuum membrane with the characteristics mentioned above. Its task is to seal off the second space 27 from the surroundings. Typical materials for this are foils or rubber membranes. Examples for a 180° C. (350° F.) application include, for example, foils based on PTFE, FEP, etc. other materials may be considered, depending on the selected matrix system and its specific curing temperature, taking into account the above-mentioned requirements.

The peel ply 13 serves to facilitate separation (by peeling), after completion of the process, of the flow promoting device 15 filled with matrix material from the component 1, because all the process materials mentioned are only used as auxiliaries in the production of the component 1. The peel ply 13 is configured to resist permanent connection with the matrix material and the surface of the component. This is achieved by a particular surface structure of the peel ply and/or by additional non-stick coatings (such as, for example, PTFE, silicon, etc.). Typical materials are, for example, woven glass fabrics, woven nylon fabrics, etc. The peel ply must be gas-permeable and also permeable to matrix material in both direction.

The membrane 7 is a semi-permeable membrane, e.g., made of a technical plastic material, which meets the process conditions as far as temperature resistance and media resistance are concerned. Furthermore, this membrane is gas-permeable but impermeable to liquids with viscosities that are comparable to water. This behavior is achieved by gas-permeable pores arranged in the membrane, the pores being distributed on the surface of the membrane over a greater or a lesser area. The size of the pores is selected so that the matrix system cannot penetrate them. The thickness of the membrane is in the range of tenths of a millimeter. Adequate flexibility for draping and forming is provided by the use of typical plastic materials.

The ventilation fabric 32 above the flow promoting device 15 serves to convey the air and other volatile components sucked through the membrane, for removal by suction to the vacuum pump 29. This material may include any material as long as it provides adequate temperature resistance and media resistance to the materials necessary during the process, and as long as the conveyance of air in longitudinal direction is possible. Fluffy mats, woven fabrics, knitted fabrics, braided fabrics, etc. are used for this purpose, whereby the articles may be made from metal, plastic or other materials.

The flow promoting device 15 enables distribution on the surface of the component 1 of the matrix material which reached space 25 via the matrix supply pipe. The flow promoting device 15 thus assumes the function of a flow channel. The flow promoting device 15 must maintain a minimum thickness when subjected to the vacuum build-up of foil 19 so as to enable such material flow. It is thus a spacer that forms a flow channel between the membrane 7 and the component 1. The flow promoting device may be a braided fabric, a woven fabric, a knitted fabric, etc., with, if at all possible, a wide-meshed structure so as to create little flow resistance. Any materials may be used, e.g., metal, plastic, etc., as long as the above-mentioned common minimum requirements (temperature and media resistance) are met. To support the transport of the matrix, the matrix supply pipe 33 may reach as far as required into the first space 10. One branch or several supply pipes are possible. Within the first space 10, this matrix supply pipe may include apertures, for example, holes, transverse slots, longitudinal slots, etc. These assist resin transport in the flow promoting device.

Figure 2:
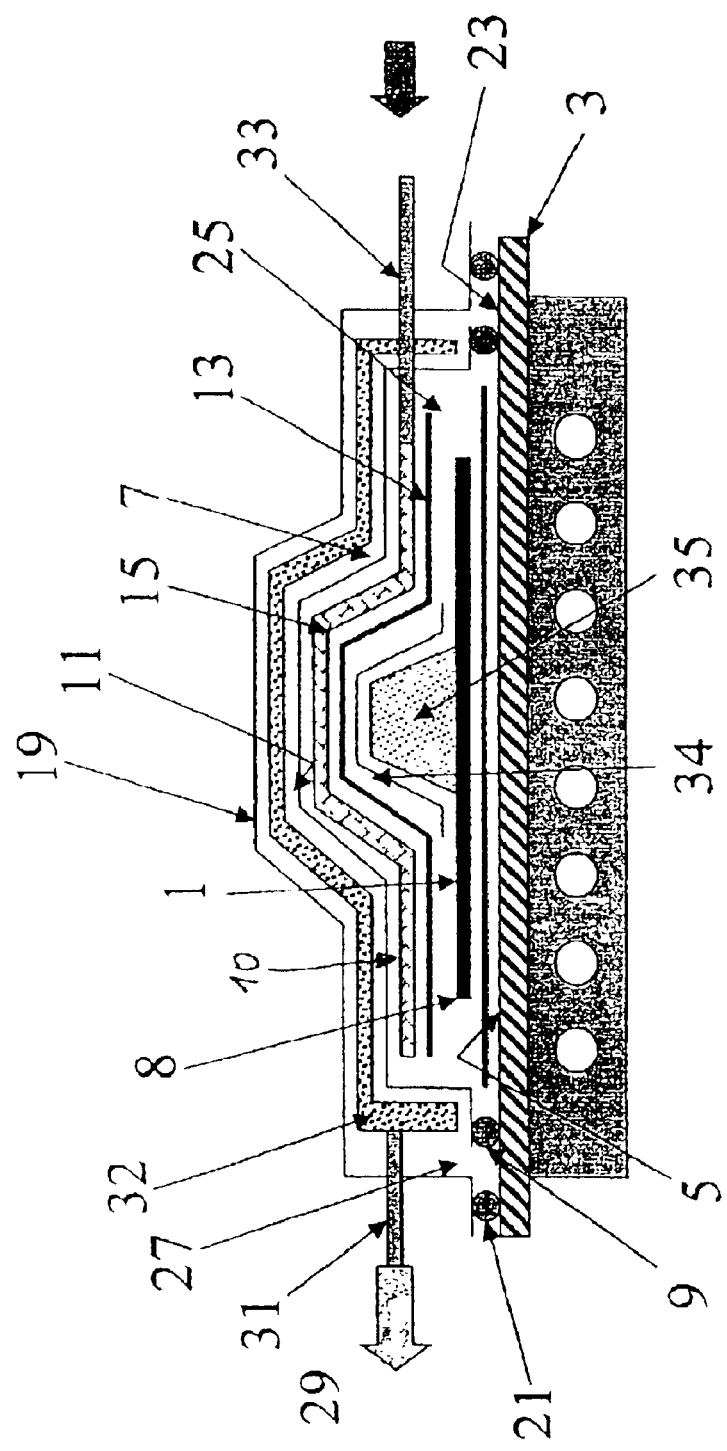
FIG. 2 is a schematic cross-sectional view through another example embodiment of a device according to the present invention having a typical design of an integrally stiffened component as a sandwich hat-profile.
Figure 3:
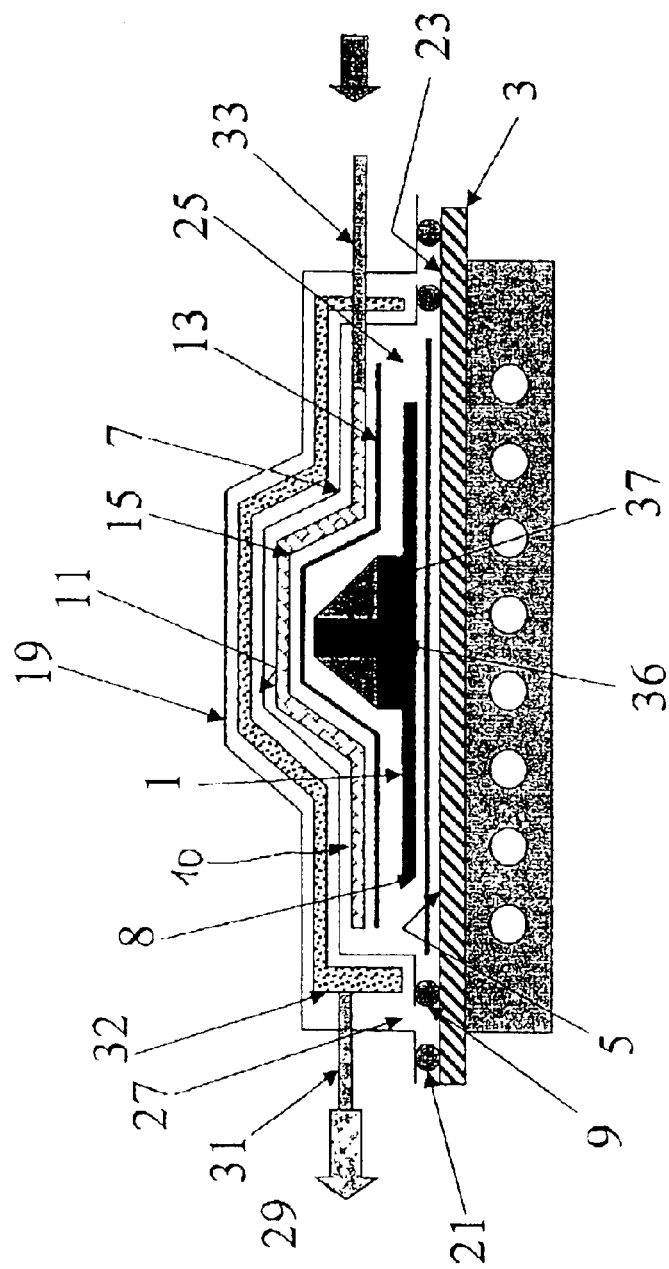
FIG. 3 is a schematic cross-sectional view through a further example embodiment of a device according to the present invention having a typical design of an integrally stiffened component as a T-profile.

FIGS. 2 and 3 illustrate the device according to the present invention as illustrated in FIG. 1, except that FIGS. 2 and 3 illustrate a different component 1. The reference numbers for components of the same function are the same in these Figures. The device according to the present invention is suitable for components of almost any shape. FIG. 2 schematically illustrates a planking field (component 1) which in one direction is stiffened by hat profiles. These hat profiles include a foam core 35 or a core formed from any material, with a closed surface and with dry fiber composite preforms 34 placed thereon, the dry fiber composite preforms being hat-shaped. The fiber composite preforms 34 are made from materials that are identical or similar to those of component 1. The foam core 35 and the preforms 34 form part of component 1.

The component 1 illustrated in FIG. 3 is also a planking field which in longitudinal direction is stiffened by one or several T-profiles 36. Component 1 which is to be produced as illustrated in FIG. 3 thus includes the individual components 1 and 34. The T-profiles 34 are made from materials that are identical or similar to those of component 1. In addition, this component variant requires a support 37 for fixing the dry T-profiles 36 which in their non-impregnated state are unstable. These supports 37 may be made from typically rigid or semi-flexible tool materials such as, e.g., metal, wood, rubber, plastic, etc. Since there is direct contact with the matrix material, this material of the supports 37 must keep its form in relation to the matrix material during the process.

Figure 4:
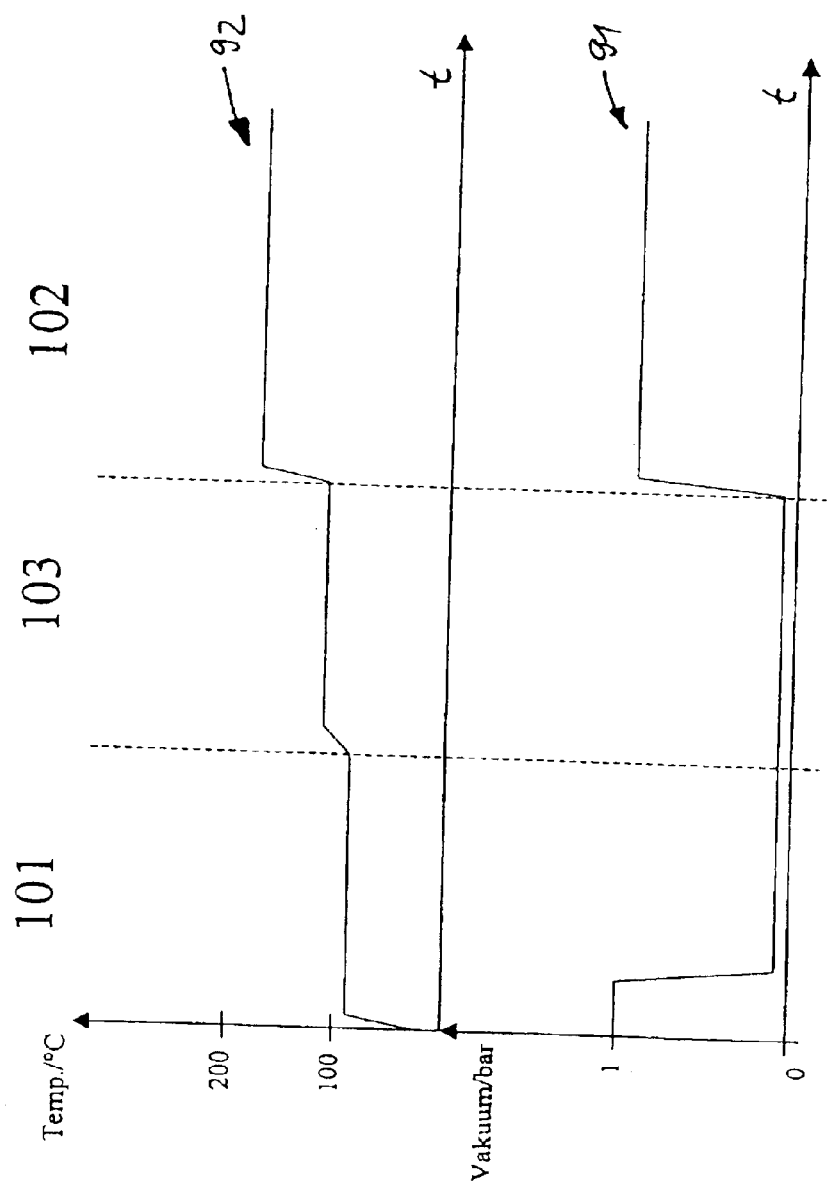
FIG. 4 is a graph illustrating a typical temperature and vacuum gradient over time for a so-called 350° F. system.
Figure 5:
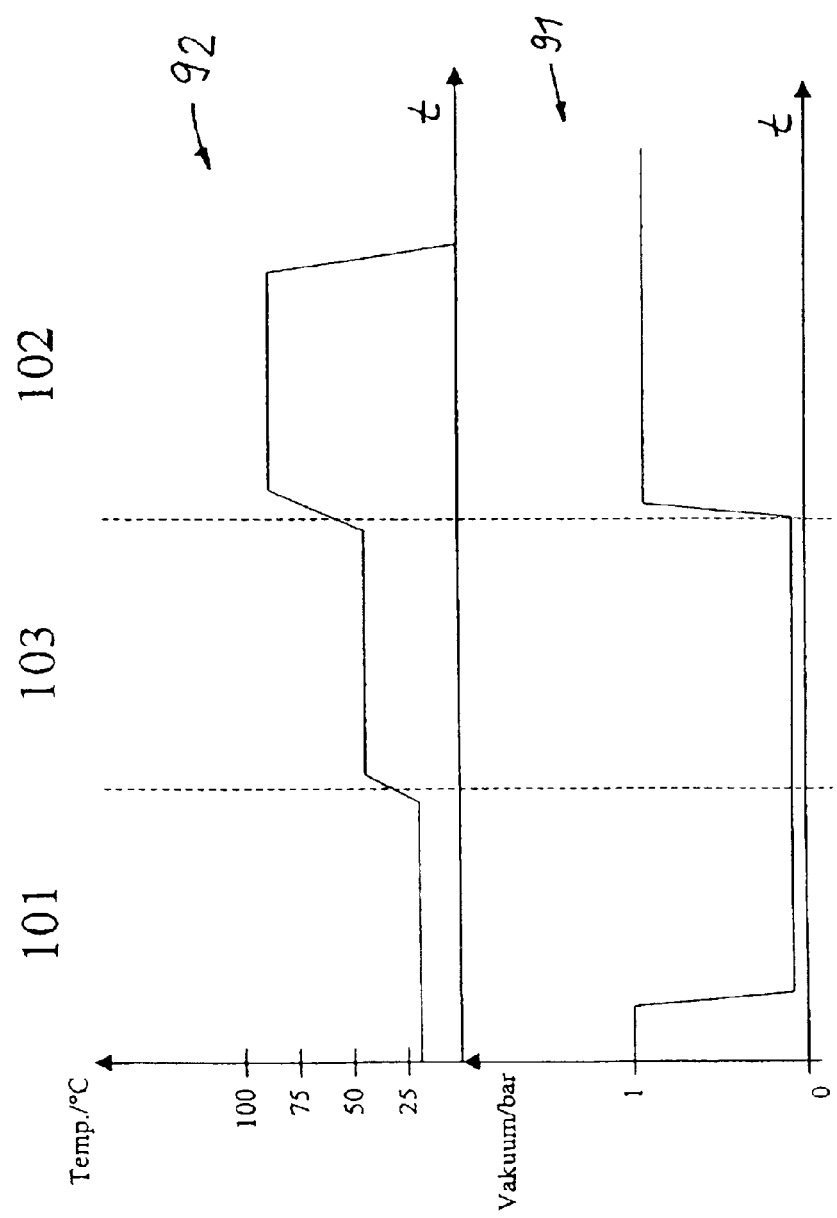
FIG. 5 is a graph illustrating a typical temperature and vacuum gradient over time for a so-called room temperature (RT) system.

FIGS. 4 and 5 illustrate typical gradients of various resin system classes as a vacuum gradient 91 and a temperature gradient 92, with the gradient illustrated in FIG. 4 relating to a 350° F. system and the gradient illustrated in FIG. 5 relating to an RT-system.

The temperature and vacuum gradients may be broken down into at least two phases, the injection phase 101 and the curing phase 103. A tempering phase 102 may be provided after these phases. In the injection phase 101 the temperature is lower than in the curing phase 103.

The temperature gradient and the vacuum control are such that the cured component is of optimum quality with few to no pores and a suitable fiber volume fraction being achieved. The specifications for temperature are determined by the materials requirements of the matrix material. Irrespective of the matrix material selected, during the entire process right through to curing, i.e., the condition in which the matrix material has changed its aggregate state from liquid to irreversibly solid, the vacuum may be kept at a constant level. Normal values and tolerances that must be observed include for example 1 to 10 mbar (absolute pressure, near the ideal vacuum). After curing 103, it is no longer necessary to maintain a vacuum. The necessary temperature gradients are characterized as follows: during the injection phase 101 at full vacuum, a temperature is required that is determined by the viscosity curve of the matrix material. The temperature is selected such that the matrix material becomes liquid enough to reach the interior space 25 via the supply pipe 33 by vacuum suction. This is the minimum temperature necessary for the process. At the same time, this temperature must not be so high as to cause curing (loss of viscosity, solid state of the matrix). Therefore (depending on the matrix material selected), the process temperature is set such that injection is possible (slight viscosity) and that the remaining time to curing for the injection, i.e., near-complete filling of the interior space 25 with matrix material is adequate (technical term, e.g., gel time). Typically, the necessary viscosities during the injection phase range, e.g., from 1 to 1000 mPas. Typical temperatures for a 350° F. (180° C.) system are, e.g., 70 to 120° C. for the injection phase 101, approximately 100 to 180° C. for the curing phase 103, and values of approximately 160 to 210° C. for the tempering phase 102.

For selected matrix materials, e.g., RT matrix materials, the following variant is possible: injection temperature 101 equals curing temperature 103 equals tempering temperature 102.

The vacuum is established before the injection phase 101 (FIG. 4) or before it. In the method according to the present invention, a vacuum that typically ranges from 1 to 10 mbar, is generated for injection, the vacuum extending to completion of the curing phase. The vacuum should not be reduced.

The method according to the present invention is described below:

Dry materials (e.g. carbon fiber reinforced interlaid scrim, woven fabric, etc.) are positioned as specified in the design, and thus a laminate structure is formed from the individual layers of preform. The tool has been pre-treated to separate, i.e., by release agents or separating foil and peel ply (altogether this constitutes the design 5 on the underside of component 1). This prevents sticking of the matrix material to the tool and allows removal of the component (stripping) from the tool surface. The dry material of the component 1 may include the peel ply 13. In addition, a so-called flow promoting device 15 is simply placed above this construction. In the case of complex components, local lateral attachment, e.g. with temperature-resistant adhesive tape, may be provided. The membrane 7, which is air-permeable but not liquid-permeable, is placed onto this flow promoting device 15 and sealed off by the seal 21. Then, the ventilation fabric 32 is placed on the membrane 7 and sealed off from the surroundings by the foil 19 and the seal 21. During this procedure, the matrix supply pipe 33 and the vacuum pipe 29 are put in place with commercially available bushings and seals as illustrated in FIG. 1.

After placement of the above-mentioned materials and the foil or vacuum film 19, the first space 10 is evacuated using the vacuum pump. At the same time, a reservoir containing matrix material is connected to the system to introduce matrix material into the first space 10. The vacuum results in a drop in pressure so that the matrix material is sucked from the reservoir into the evacuated first space 25. After this, the matrix material flows through the flow promoting device 15 and the supply pipe 33 and is distributed on the surface of the component, more or less unhindered, and almost irrespective of its viscosity characteristics. Any air present is disposed of through the membrane 7, as a result of permanent evacuation, by suction, of the interior space 27. There is no flow of matrix material within the laminate construction, which is characterized by considerable flow resistance. Instead, the infiltration of matrix material occurs from the component surface vertically downward into the laminate. The maximum flow path at each position of the component is thus directly related to the component thickness at this point. The flow resistance is thus minimal. Consequently, it is possible to use resin systems, which, due to their viscosity, were hitherto unsuitable for infiltration, and it is possible to create components of large dimensions.

Membrane 7 serves the purpose of preventing the occurrence of local air cushions. If, for example, the flow fronts which form, close up, creating a closed air cushion in component 1 of the interior space 25 without binding to the vacuum outflow of the air, no resin may flow into this air cushion. A defect (no impregnation) would be the result. The air-permeable membrane 7 prevents this effect because at every position in the component, air may always move vertically to the surface, through the membrane, into a resin free space which may be ventilated, of the vacuum build-up 27. From there, above the membrane 7, the air is removed by suction, via the vacuum connection 29 by the ventilation fabric 32. The membrane is resin-impermeable. There is thus no need for monitoring the flow fronts because the process of impregnation is self-regulating. The degree of impregnation is directly related to the quantity of resin supplied and thus available to the process, as well as being directly related to the quantity of fiber supplied.

As soon as complete impregnation has occurred, curing is performed at a suitable temperature while the vacuum is maintained at the same level. In conventional processes, the bubbles arising as a result of the chemical process (matrix boiling, volatile components, etc.) would lead to pore formation in the finished component. This is prevented by the membrane 7, because permanent ventilation vertical to the surface of the component occurs through the membrane.

On completion of curing, the component may be stripped. This means that all process materials are removed from component 1, e.g., by peeling them off manually, and the component may be separated from the tool 3. Depending on requirements, the now stripped hard component with preforms impregnated with matrix, may be subjected to a pure thermal after-treatment (tempering in step 102). Tempering may also occur prior to stripping, but this is not necessary. Tempering after stripping will reduce the time during which the tool is tied up.

The maximum size of components that may be produced with the method according to the present invention is almost unlimited. A natural upper limit is more likely to be dictated by considerations associated with handling of the component (transport, etc.) rather than with the method itself. There is no minimum size for these components. The maximum achievable thickness depends on the resin types used and the available injection time. This injection time is determined by economic rather than technical limits. Other undesirable side effects, such as, for example, an exothermal reaction during curing, depend only on the resin system rather than on the method.

In summary, the present invention relates to a method for producing fiber-reinforced plastic components made of dry fiber composite preforms by an injection method for injecting matrix material. In this method, removal by suction, of air from the second space 27 occurs, resulting in a pressure drop from the first space 10 to the second space 27, with matrix material being sucked from the reservoir into the evacuated first space 10. Because of the flow promoting device 15, the matrix material enters the preform 1 vertically, in a distributed manner, above the surface 11 of the preform 1 facing the membrane 7. By combining the functions of distributing the matrix material above the component surface through the flow promoting device, and the possibility of area-like ventilation above the component, as well as the flow promoting device, through the membrane foil, the desired quality is achieved with curing in a vacuum, without the use of overpressure.

What is claimed is:

1. A method for producing a fiber-reinforced plastic component made of dry fiber composite preforms by an injection method for injecting matrix material, comprising the steps of:

arranging the fiber composite preform on a tool;

creating a first space by a gas-permeable and matrix-material-impermeable membrane arranged at least on one side around the preform, matrix material being feedable into the first space;

creating a second space adjacent to the first space, the second space being delimited from surroundings by a foil that is impermeable to gaseous material and matrix material, the foil being sealed off from the tool; and removing by suction air from the second space, matrix material being sucked from a reservoir into the evacuated first space, being distributed above the surface of the preform, and penetrating the preform vertically.

2. A device for producing fiber-reinforced plastic components made of dry fiber composite performs by an injection method for injecting matrix material, comprising:

a tool configured to arrange the fiber composite preform;

a gas-permeable and matrix-material-impermeable membrane arranged at least on one side around the preform and creating a first space into which matrix material is feedable;

a flow promoting device arranged on a surface of the preform; and a second space, sealed off from the tool, adjacent to the first space, the second space delimited from surroundings by a foil that is impermeable to gaseous material and matrix material;

wherein the device is configured so that removal by suction of air from the second space results in matrix material being sucked from a reservoir into the evacuated first space, the flow promoting device being configured to cause distribution of the matrix material above the surface of the preform facing the flow promoting device, thereby causing the matrix material to penetrate the preform vertically.

3. The method according to claim 1, further comprising sealing the first space by coupling the gas-permeable and matrix-material-impermeable membrane to the tool in an area surrounding the preform.

4. The device according to claim 2, wherein the first space is sealed by a coupling of the gas-permeable and matrix-material-impermeable membrane to the tool in an area surrounding the preform.

5. The method according to claim 1, further comprising:
arranging a flow promoting device on one surface of the preform, the flow promoting device causing distribution of the matrix material above the surface of the preform facing the flow promoting device.

* * * * *